United States Patent
Zhu (10) Patent No.: US 8,060,449 B1
(45) Date of Patent: Nov. 15, 2011

(54) PARTIALLY DELEGATED OVER-THE-AIR PROVISIONING OF A SECURE ELEMENT

(75) Inventor: Kevin Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 372 days.

(21) Appl. No.: 12/348,371

(22) Filed: Jan. 5, 2009

(51) Int. Cl.
*G06Q 20/00* (2006.01)
*G06Q 30/00* (2006.01)
*G06F 7/04* (2006.01)

(52) U.S. Cl. .................. 705/75; 705/14.51; 705/14.64; 726/26

(58) Field of Classification Search .................. 726/26; 705/14.51, 14.64, 75
See application file for complete search history.

(56) References Cited

U.S. PATENT DOCUMENTS

| | | | |
|---|---|---|---|
| 5,276,311 A | 1/1994 | Hennige | |
| 5,310,999 A | 5/1994 | Claus et al. | |
| 5,453,601 A | 9/1995 | Rosen | |
| 5,496,966 A | 3/1996 | Hightower et al. | |
| 5,530,702 A | 6/1996 | Palmer et al. | |
| 5,590,038 A | 12/1996 | Pitroda | |
| 6,000,608 A | 12/1999 | Dorf | |
| 6,012,634 A | 1/2000 | Brogan et al. | |
| 6,122,625 A | 9/2000 | Rosen | |
| 6,199,161 B1 | 3/2001 | Ahvenainen | |
| 6,290,127 B1 | 9/2001 | Schilling | |
| 6,360,954 B1 | 3/2002 | Barnardo | |
| 6,405,181 B2 | 6/2002 | Lent et al. | |
| 6,446,049 B1 | 9/2002 | Janning et al. | |
| 6,466,777 B1 | 10/2002 | Urita | |
| 6,591,098 B1 | 7/2003 | Shieh et al. | |
| 6,631,849 B2 | 10/2003 | Blossom | |
| 6,679,423 B2 | 1/2004 | Ijichi et al. | |
| 6,705,521 B1 | 3/2004 | Wu et al. | |
| 6,755,342 B1 | 6/2004 | Jordan, Jr. | |
| 6,817,521 B1 | 11/2004 | Matada | |
| 6,879,965 B2 * | 4/2005 | Fung et al. ...................... | 705/39 |
| 6,880,085 B1 | 4/2005 | Balczewski et al. | |
| 6,938,821 B2 | 9/2005 | Gangi | |
| 7,146,159 B1 | 12/2006 | Zhu | |

(Continued)

FOREIGN PATENT DOCUMENTS

WO   WO2004105421 A2   12/2004

OTHER PUBLICATIONS

"Sourcebook '96", Progressive Grocer Sourcebook '96 Supplement, pp. Cover-48, Dec. 1995.*

(Continued)

*Primary Examiner* — Andrew J. Fischer
*Assistant Examiner* — Calvin Cheung (57) ABSTRACT

A system for provisioning a secure element on a mobile device is provided. The system comprises a first trusted service manager associated with a credit card, a second trusted service manager associated with a wireless service provider, and a mobile device. The mobile device has a secure element to hold the credit card and an over-the-air client to communicate wirelessly with the first trusted service manager and the second trusted service manager. When the second trusted service manager receives a message from the first trusted service manager to provision a personalization information for the credit card to the mobile device, the second trusted service manager transmits to the over-the-air client a message to initiate transfer of the personalization information for the credit card.

17 Claims, 8 Drawing Sheets

U.S. PATENT DOCUMENTS

| | | | |
|---|---|---|---|
| 7,233,785 | B2 | 6/2007 | Yamagishi et al. |
| 7,269,256 | B2 | 9/2007 | Rosen |
| 7,413,113 | B1 | 8/2008 | Zhu |
| 7,434,723 | B1 | 10/2008 | White et al. |
| 7,475,044 | B1 | 1/2009 | Kawai et al. |
| 7,494,067 | B1 | 2/2009 | Zhu |
| 7,546,956 | B2 | 6/2009 | Adams et al. |
| 7,644,039 | B1 | 1/2010 | Magee et al. |
| 7,644,859 | B1 | 1/2010 | Zhu |
| 7,676,432 | B2 | 3/2010 | Ling |
| 7,707,113 | B1 | 4/2010 | DiMartino et al. |
| 7,748,636 | B2 | 7/2010 | Finn |
| 7,819,307 | B2 | 10/2010 | Lyons et al. |
| 7,822,688 | B2 * | 10/2010 | Labrou et al. ............... 705/67 |
| 7,926,714 | B1 | 4/2011 | Zhu |
| 2001/0005184 | A1 | 6/2001 | Tsuno et al. |
| 2001/0013551 | A1 | 8/2001 | Ramachandran |
| 2002/0006806 | A1 | 1/2002 | Kinnunen et al. |
| 2002/0011519 | A1 | 1/2002 | Shults, III |
| 2002/0052193 | A1 | 5/2002 | Chetty |
| 2002/0052754 | A1 * | 5/2002 | Joyce et al. ............... 705/1 |
| 2002/0062284 | A1 | 5/2002 | Kawan |
| 2002/0088852 | A1 | 7/2002 | Ohta et al. |
| 2002/0123971 | A1 | 9/2002 | Maritzen et al. |
| 2002/0128982 | A1 | 9/2002 | Gefwert et al. |
| 2002/0136199 | A1 | 9/2002 | Hartmaier |
| 2002/0147913 | A1 | 10/2002 | Lun Yip |
| 2002/0188575 | A1 | 12/2002 | Freeny, Jr. |
| 2002/0195487 | A1 | 12/2002 | Hosogoe |
| 2003/0009382 | A1 | 1/2003 | D'Arbeloff et al. |
| 2003/0028481 | A1 | 2/2003 | Flitcroft et al. |
| 2003/0032409 | A1 | 2/2003 | Hutcheson et al. |
| 2003/0045328 | A1 | 3/2003 | Natsuno |
| 2003/0070080 | A1 | 4/2003 | Rosen |
| 2003/0083933 | A1 * | 5/2003 | McAlear ............... 705/14 |
| 2003/0125054 | A1 | 7/2003 | Garcia |
| 2003/0149900 | A1 | 8/2003 | Glassman et al. |
| 2003/0161503 | A1 | 8/2003 | Kramer |
| 2003/0220876 | A1 | 11/2003 | Burger et al. |
| 2003/0233320 | A1 | 12/2003 | Connor, Jr. |
| 2004/0044622 | A1 | 3/2004 | Blott et al. |
| 2004/0093265 | A1 | 5/2004 | Ramchandani et al. |
| 2004/0122685 | A1 | 6/2004 | Bunce |
| 2004/0122771 | A1 | 6/2004 | Celi, Jr. et al. |
| 2004/0139024 | A1 | 7/2004 | So |
| 2004/0159700 | A1 | 8/2004 | Khan et al. |
| 2004/0192303 | A1 | 9/2004 | Puthenkulam |
| 2004/0198333 | A1 | 10/2004 | Zanaty |
| 2004/0203601 | A1 | 10/2004 | Morriss et al. |
| 2004/0204070 | A1 | 10/2004 | August et al. |
| 2005/0216424 | A1 | 9/2005 | Gandre et al. |
| 2005/0234778 | A1 | 10/2005 | Sperduti et al. |
| 2006/0073808 | A1 * | 4/2006 | Buchert ............... 455/406 |
| 2006/0085847 | A1 | 4/2006 | Ikeuchi et al. |
| 2006/0136334 | A1 | 6/2006 | Atkinson et al. |
| 2006/0165060 | A1 * | 7/2006 | Dua ............... 370/352 |
| 2006/0167823 | A1 | 7/2006 | York et al. |
| 2006/0191995 | A1 | 8/2006 | Stewart et al. |
| 2006/0211408 | A1 | 9/2006 | Yamagishi et al. |
| 2007/0010213 | A1 | 1/2007 | Dewan |
| 2007/0011461 | A1 | 1/2007 | Jeng |
| 2007/0080215 | A1 | 4/2007 | Ramachandran et al. |
| 2007/0095892 | A1 | 5/2007 | Lyons et al. |
| 2007/0125840 | A1 | 6/2007 | Law et al. |
| 2007/0198410 | A1 | 8/2007 | Labgold et al. |
| 2007/0223685 | A1 | 9/2007 | Boubion et al. |
| 2007/0233615 | A1 | 10/2007 | Tumminaro |
| 2007/0244811 | A1 | 10/2007 | Tumminaro |
| 2007/0248232 | A1 | 10/2007 | Driscoll et al. |
| 2007/0255620 | A1 | 11/2007 | Tumminaro et al. |
| 2007/0255652 | A1 | 11/2007 | Tumminaro et al. |
| 2007/0278291 | A1 | 12/2007 | Rans et al. |
| 2007/0281664 | A1 | 12/2007 | Kaneko et al. |
| 2007/0291995 | A1 | 12/2007 | Rivera |
| 2008/0059379 | A1 | 3/2008 | Ramaci et al. |
| 2008/0067240 | A1 | 3/2008 | Nakano et al. |
| 2008/0126260 | A1 | 5/2008 | Cox et al. |
| 2008/0201212 | A1 | 8/2008 | Hammad et al. |
| 2008/0208681 | A1 | 8/2008 | Hammad et al. |
| 2008/0238610 | A1 | 10/2008 | Rosenberg |
| 2008/0297306 | A1 | 12/2008 | Huajun et al. |
| 2008/0315989 | A1 | 12/2008 | Mirkazemi-Moud et al. |
| 2009/0018964 | A1 * | 1/2009 | Liu et al. ............... 705/76 |
| 2009/0046858 | A1 | 2/2009 | Iyer et al. |
| 2009/0050689 | A1 | 2/2009 | Sako et al. |
| 2009/0078761 | A1 | 3/2009 | Sines |
| 2009/0093272 | A1 | 4/2009 | Saarisalo et al. |
| 2009/0097531 | A1 | 4/2009 | Franceschini et al. |
| 2009/0253409 | A1 | 10/2009 | Slavov et al. |
| 2009/0270174 | A1 | 10/2009 | Kelly et al. |
| 2009/0313689 | A1 | 12/2009 | Nyström et al. |
| 2010/0030651 | A1 * | 2/2010 | Matotek et al. ............... 705/17 |
| 2010/0094752 | A1 * | 4/2010 | Heath ............... 705/40 |
| 2010/0133337 | A1 | 6/2010 | Van Rensburg |
| 2011/0006112 | A1 | 1/2011 | Mueller |
| 2011/0053560 | A1 | 3/2011 | Jain et al. |

OTHER PUBLICATIONS

Katzer, Robin Dale, "System and Method of Over-the-Air Provisioning," U.S. Appl. No. 12/026,224, filed Feb. 5, 2008.

Zhu, Kevin, "System and Method of Provisioning Confidential Information Via a Mobile Device," U.S. Appl. No. 12/254,267, filed Oct. 20, 2008.

Dimartino, Allison, "Method for Launching an Electronic Wallet," Filing Date—Dec. 3, 2007, U.S. Appl. No. 11/949,759.

Dimartino, Allison, "Method and System for Blocking Confidential Information at a Point-of-Sale Reader from Eavesdropping," Filing Date—Sep. 27, 2007, U.S. Appl. No. 11/863,229.

Dimartino, Allison A., et al., Patent Application entitled, "System and Method for Active Jamming of Confidential Information Transmitted at a Point-of-Sale Reader," filed Jan. 30, 2008, U.S. Appl. No. 12/022,903.

Katzer, Robin D., et al., Patent Application entitled, "Control of Secure Elements through Point-of-Sale Device," filed Apr. 8, 2008, U.S. Appl. No. 12/099,771.

Zhu, Kevin, Patent Application entitled, "Mobil Device Password System," filed Jan. 5, 2009, U.S. Appl. No. 12/348,377.

Persson, Sarah A.V., et al., Patent Application entitled, "Electronic Wallet Removal from Mobile Electronic Devices," filed Feb. 16, 2009, U.S. Appl. No. 12/371,901.

BlackBerry Enterprise Server for Microsoft Exchange, Version 4.0—Handheld Management Guide, Last Modified Aug. 18, 2006, Research in Motion Limited, Canada.

BlackBerry Enterprise Server for Microsoft Exchange, Version 4.0—Administration Guide, Last Modified Nov. 10, 2006, Research in Motion Limited, Canada.

Derfler, Frank J., et al., "How Networks Work," Sep. 2000, Que Corporation, A Division of MacMillan Computer Publishing, USA.

Office Action dated Jun. 17, 2009, U.S. Appl. No. 11/949,759, filed Dec. 3, 2007.

Office Action dated Nov. 13, 2009, U.S. Appl. No. 11/949,759, filed Dec. 3, 2007.

Office Action dated May 25, 2010, U.S. Appl. No. 11/949,759, filed Dec. 3, 2007.

Final Office Action dated Sep. 10, 2010, U.S. Appl. No. 11/949,759, filed Dec. 3, 2007.

Office Action dated Feb. 15, 2011, U.S. Appl. No. 11/949,759, filed Dec. 3, 2007.

Office Action dated Feb. 17, 2009, U.S. Appl. No. 11/863,229, filed Sep. 27 2007.

Office Action dated Sep. 14, 2009, U.S. Appl. No. 11/863,229, filed Sep. 27, 2007.

Office Action dated Dec. 24, 2009, U.S. Appl. No. 11/863,229, filed Sep. 27, 2007.

Final Office Action dated Jun. 22, 2010, U.S. Appl. No. 11/863,229, filed Sep. 27, 2007.

Office Action dated Mar. 16, 2011, U.S. Appl. No. 11/863,229, filed Sep. 27, 2007.

Office Action dated Mar. 6, 2009, U.S. Appl. No. 11/863,632, filed Sep. 28, 2007.

Office Action dated May 6, 2009, U.S. Appl. No. 11/863,632.

Notice of Allowance dated Dec. 1, 2009, U.S. Appl. No. 11/863,632.

Office Action dated Mar. 11, 2011, U.S. Appl. No. 12/022,903.
Office Action dated Mar. 1, 2011, U.S. Appl. No. 12/099,771.
Office Action dated Jan. 13, 2011, U.S. Appl. No. 12/348,377.
Office Action—Restriction dated Mar. 14, 2011, U.S. Appl. No. 12/371,901.
Office Action dated Apr. 14, 2011, U.S. Appl. No. 12/371,901.
Office Action dated Nov. 8, 2010, U.S. Appl. No. 12/026,224.
Office Action dated May 12, 2010, U.S. Appl. No. 12/026,224.
Final Office Action dated Apr. 28, 2011, U.S. Appl. No. 12/026,224.
Office Action dated Oct. 5, 2010, U.S. Appl. No. 12/254,267.
Final Office Action dated Mar. 7, 2011, U.S. Appl. No. 12/254,267.
Office Action dated Oct. 3, 2005, U.S. Appl. No. 10/744,169.
Office Action dated Feb. 2, 2006, U.S. Appl. No. 10/744,169.
Final Office Action dated Jun. 8, 2006, U.S. Appl. No. 10/744,169.
Notice of Allowance dated Aug. 1, 2006, U.S. Appl. No. 10/744,169.

Dimartino, Allison A., et al., Patent Application entitled, "System and Method for Active Jamming of Confidential Information Transmitted at a Point-of-Sale Reader," filed Aug. 11, 2011, U.S. Appl. No. 13/207,645.
Final Office Action dated Aug. 5, 2011, U.S. Appl. No. 11/949,759, filed Dec. 3, 2007.
Notice of Allowance dated Jun. 21, 2011, U.S. Appl. No. 12/022,903.
Office Action dated Aug. 3, 2011, U.S. Appl. No. 12/099,771.
Final Office Action dated Jun. 20, 2011, U.S. Appl. No. 12/348,377.
Final Office Action dated Aug. 22, 2011, U.S. Appl. No. 11/863,229, filed Sep. 27, 2007.
Supplemental Notice of Allowance dated Sep. 13, 2011, U.S. Appl. No. 12/022,903.
Advisory Action dated Aug. 30, 2011, U.S. Appl. No. 12/348,377.
Notice of Allowance dated Sep. 6, 2011, U.S. Appl. No. 12/026,224.

* cited by examiner

PARTIALLY DELEGATED OVER-THE-AIR PROVISIONING OF A SECURE ELEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile terminals, for example mobile phones, personal digital assistants, and others, have become very widely distributed throughout our society. Increasingly mobile terminals are provisioned with financial and/or payment capabilities such as electronic wallets, credit cards, debit cards, and/or transit cards. Some of these cards may be provisioned in a secure element (SE) portion of the memory of the mobile terminal. Typically, secure elements are communicated with according to known protocols directed to promote security of information stored in the secure element, for example, personal financial information. Over time, new cards may be provisioned in the secure element of the mobile terminal or in other portions of the memory of the mobile terminal. Provisioning of new cards may be performed over-the-air (OTA), for example, by an over-the-air server sending provisioning messages to an over-the-air client on the mobile terminal.

SUMMARY

In an embodiment, a system for provisioning a secure element on a mobile device is disclosed. The system comprises a first trusted service manager associated with a credit card, a second trusted service manager associated with a wireless service provider, and a mobile device. The mobile device has a secure element to hold the credit card and an over-the-air client to communicate wirelessly with the first trusted service manager and the second trusted service manager. When the second trusted service manager receives a message from the first trusted service manager to provision a personalization information for the credit card to the mobile device, the second trusted service manager transmits to the over-the-air client a message to initiate transfer of the personalization information for the credit card. When the over-the-air client receives the message to initiate transfer of the personalization information for the credit card, the over-the-air client transmits to the first trusted service manager a message to initiate transfer of the personalization information for the credit card to the over-the-air client. When the first trusted service manager receives the message to initiate transfer of the personalization information for the credit card to the over-the-air client, the first trusted service manager transmits the personalization information for the credit card to the over-the-air client. When the over-the-air client receives the personalization information for the credit card, the over-the-air client provides the personalization information for the credit card to the secure element.

In another embodiment, a method of provisioning a secure element on a mobile device is provided. The method comprises receiving a provisioning service request from a trusted service manager associated with a credit card and establishing a secure connection with the secure element of the mobile device, wherein at least a portion of the secure connection is provided by a wireless link. The method also comprises receiving a request over the secure connection from an over-the-air client of the mobile device and, in response to the request, transmitting a command over the secure connection to the over-the-air client. The command relates to at least a portion of the services identified in the provisioning service request. The method also comprises receiving a command result over the secure connection from the over-the-air client, closing the secure connection with the secure element of the mobile device, and transmitting a status of the provisioning service request to the trusted service manager. This method accomplishes, at least in part, a provisioning action performed on a credit card stored on the secure element.

In another embodiment, a method of provisioning a secure element on a mobile device is provided. The method comprises receiving a provisioning service request from a trusted service manager associated with a credit card and transmitting a message to an over-the-air client on the mobile device. The method also comprises, based on the message, establishing a secure connection between the secure element on the mobile device and the trusted service manager. At least a portion of the secure connection is provided by a wireless link. The method also comprises the over-the-air client requesting a command from the trusted service manager, the over-the-air client receiving the command from the trusted service manager and providing the command to the secure element for processing, and the over-the-air client transmitting the result of the secure element processing the command to the trusted service manager. This method accomplishes, at least in part, a provisioning action performed on a credit card stored on the secure element.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

In an embodiment, a system and method for partially delegated over-the-air provisioning is provided. The provisioning may relate to provisioning a credit card application, other financial information, or other confidential information on a mobile electronic device, for example a mobile phone, a personal digital assistant, a media player, or other device. In an embodiment, a user of a mobile device may request an electronic credit card from a credit card issuer. The credit card issuer may hand-off electronic credit card set-up activity to a third party trusted service manager, for example a server computer executing transactions under secure conditions. The third party trusted service manager may send a message to a controlling trusted service manager to load and install the electronic credit card on the mobile device. After validating the third party trusted service manager, the controlling trusted service manager may establish a secure connection with an over-the-air (OTA) client of the mobile device and exchange a series of messages with the over-the-air client to complete loading and installation of a computer application on the mobile device, for example in a secure element of the mobile device. The controlling trusted service manager may then close the secure connection and notify the third party trusted service manager of the successful loading and installation of the electronic credit card on the mobile device.

The third party trusted service manager may send a message to the controlling trusted service manager to personalize the electronic credit card on the mobile device. Personalizing the electronic credit card may involve provisioning a unique credit card number, an authorization code, and other confidential information to the mobile device. After validating the third party trusted service manager, the controlling trusted service manager may send a message to the over-the-air client on the mobile device to directly interwork with the third party trusted service manager to complete electronic credit card personalization activities. This may be referred to as a delegated provisioning action. The over-the-air client may establish a secure connection with the third party trusted service manager and send message requesting the third party trusted service manager to send a command to the over-the-air client. The third party trusted service manager sends a command to the over-the-air client that contributes to the completion of the electronic credit card personalization, and the secure element executes the command. By repeated iterations of the over-the-air client requesting commands, the third party trusted service manager sending the commands, and the secure element executing the commands, the electronic credit card personalization is completed. The over-the-air client closes the secure connection, and the third party trusted service manager may send a status of the personalization transaction to the controlling trusted service manager.

After completion of the personalization, further provisioning actions may be mediated by the controlling trusted service manager, wherein the third party trusted service manager may initiate the provisioning action but does not communicate directly with the mobile device. This partially delegated provisioning method and system may promote the controlling trusted service manager deferring the financial liability associated with the provisioning of personalization information while retaining the controlling role for managing the electronic credit card life cycle.

Figure 1:
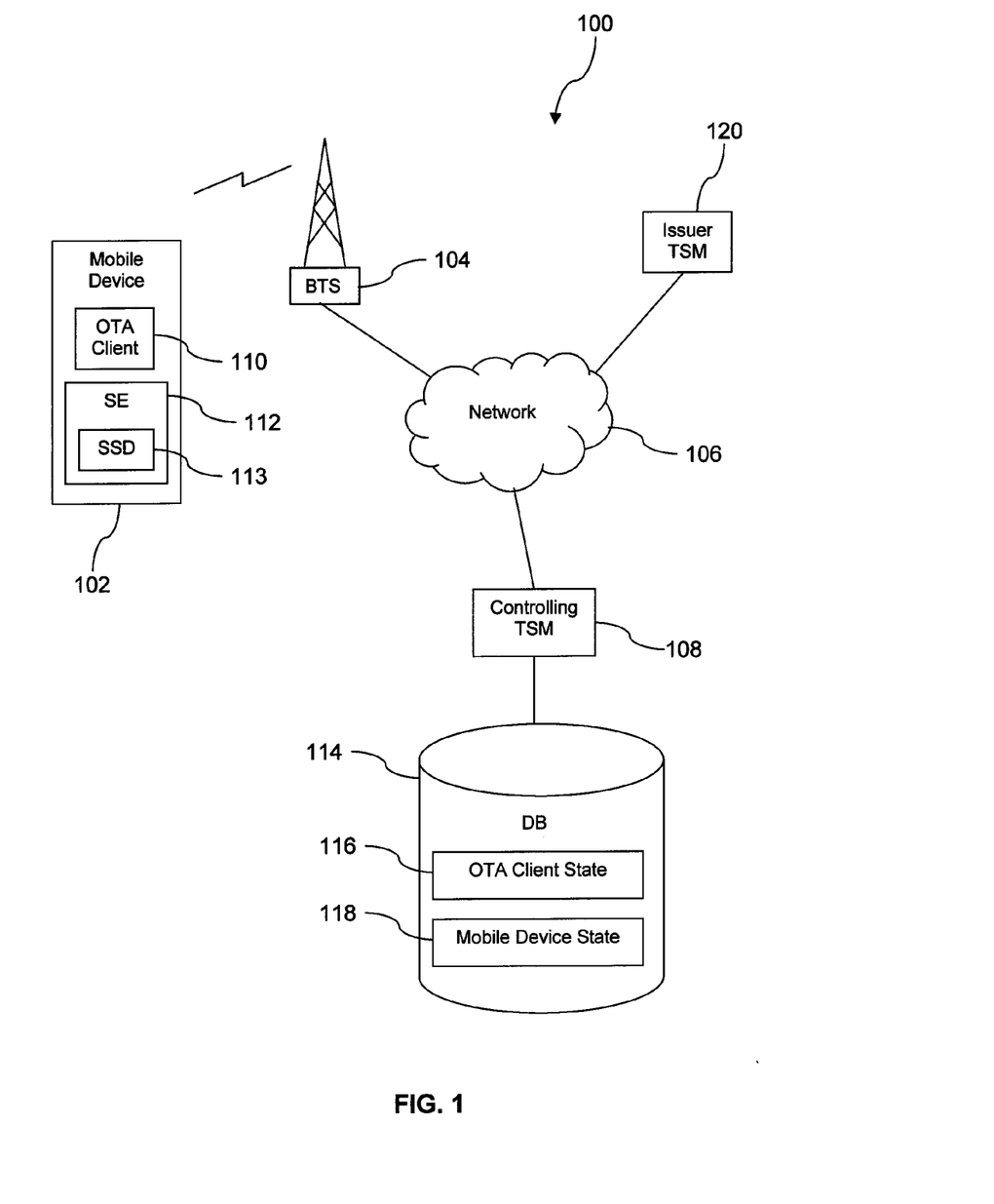
FIG. 1 is an illustration of a communications system according to an embodiment of the disclosure.

Turning now to FIG. 1, a system 100 for over-the-air provisioning of a mobile device is described. The system 100 comprises a mobile device 102, a base transceiver station 104, a network 106, a controlling trusted service manager 108, a database 114, and an issuer trusted service manager 120. The controlling trusted service manager 108 and the issuer trusted service manager 120 will be referred to hereinafter as the controlling TSM 108 and the issuer TSM 120, respectively. The mobile device 102 may comprise an over-the-air client 110, a secure element 112, and, within the secure element 112, a supplementary secure domain 113. The database 114 may comprise a plurality of over-the-air client state log entries 116 and a plurality of mobile device status log entries 118.

The network 106 may be any of a wireless network, a wired network, or a combination thereof. The mobile device 102 may communicate with the controlling TSM 108 and the issuer TSM 120 via a wireless link to the base transceiver station 104 and from the base transceiver station 104 to the network 106.

The issuer TSM 120 may be a computer server, such as a general purpose computer system. General purpose computer systems are discussed in more detail hereinafter. The issuer TSM 120 may be operated by an issuer of an electronic credit card or other financial information such as coupons, loyalty cards, transit cards, and other confidential information. Alternatively, the issuer TSM 120 may be operated by a third party on behalf of the issuer or on behalf of a plurality of issuers. In some contexts, the issuer TSM 120 may be said to be associated with a credit card or other financial information. The controlling TSM 108 may be a computer server, for example a general purpose computer system. In an embodiment, the controlling TSM 108 may be associated with a wireless service provider. While the controlling TSM 108 is shown coupled to the database 114, in an embodiment the controlling TSM 108 may be coupled to the database 114 via the network 106.

The mobile device 102 may be any of a mobile phone, a personal digital assistant, a media player, a laptop computer, a tablet computer, and other mobile electronic devices. In an embodiment, the mobile device 102 may have an uncustomary form such as an electronic watch or a fashion accessory that embeds a mobile device. A handset may be suitable for implementing some aspects of the present disclosure, and handsets are described in more detail hereinafter. A user of the mobile device 102, for example a wireless communication service subscriber, may wish to have an electronic credit card installed on the mobile device 102. By conducting over-the-air provisioning operations, an electronic credit card may be installed in the supplementary secure domain 113 in the secure element 112. If multiple electronic credit cards are installed on the mobile device 102, there may be multiple supplementary secure domains 113 contained by the secure element 112, for example one supplementary secure domain 113 for each different electronic credit card and/or transit card. In an embodiment, the secure element 112 and the electronic credit cards stored in the supplementary secure domains 113 may be considered to be components of an electronic wallet (not shown) on the mobile device 102.

When a user of the mobile device 102 wishes to add an electronic credit card to the mobile device 102, the user may arrange with the issuer of the electronic credit card to obtain the electronic credit card. The issuer may provide the appropriate electronic credit card information to the issuer TSM 120, and the issuer TSM 120 may complete the steps for setting-up the electronic credit card on the mobile device 102, at least partially mediated by the controlling TSM 108. The steps of setting-up and maintaining the electronic credit card on the mobile device 102 may be referred to generally as provisioning the electronic credit card on the mobile device 102, provisioning the electronic credit card, and/or provisioning the mobile device 102. The steps of provisioning the electronic credit card may include loading the computer program or computer application associated with the electronic credit card into the supplementary secure domain 113, installing the electronic credit card application on the mobile device 102, personalizing the electronic credit card application, modifying the electronic credit card application, locking the electronic credit card application, suspending the electronic credit card application, deleting the electronic credit card application, and other transactions.

Figure 2:
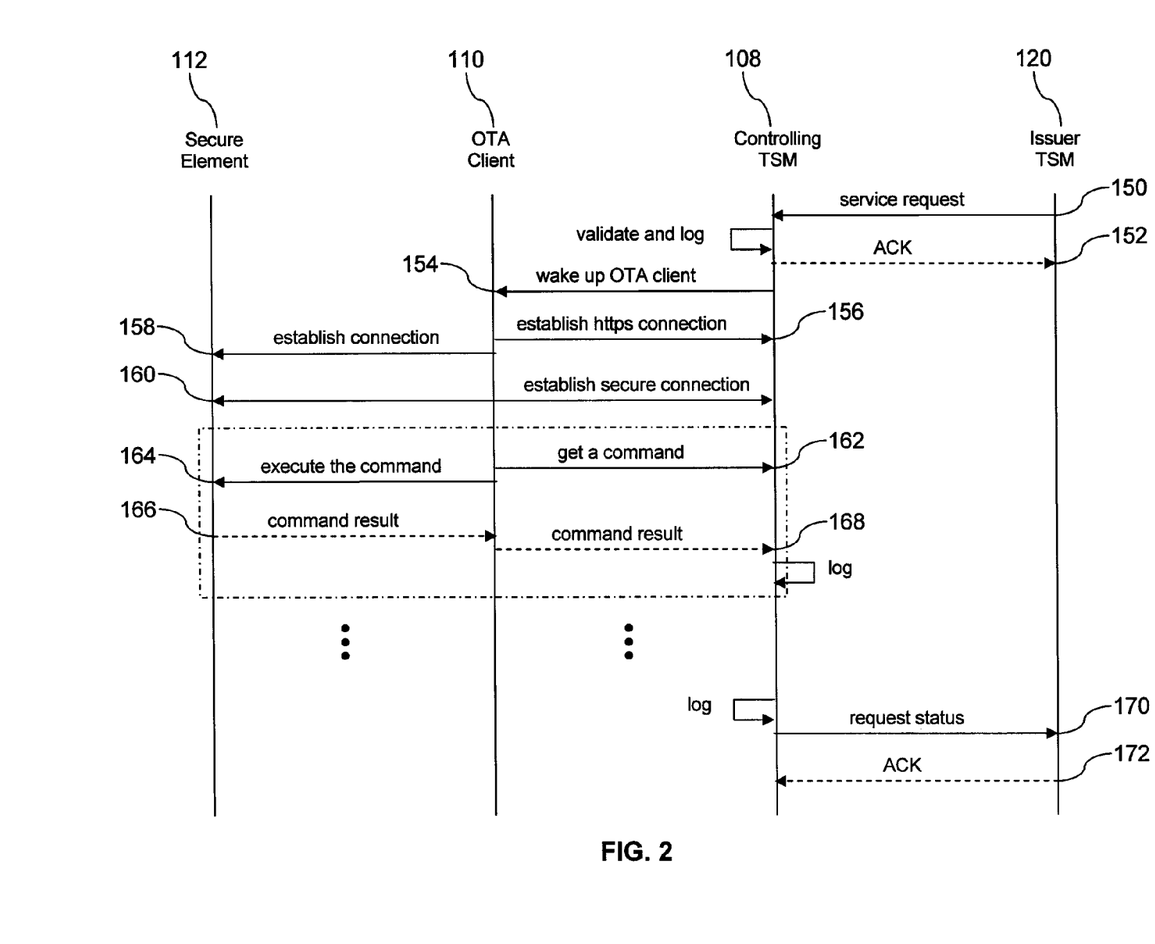
FIG. 2 is a message sequence diagram illustrating a messaging sequence according to an embodiment of the disclosure.

Turning now to FIG. 2, a message sequence for performing some provisioning actions is described. In the message sequence illustrated in FIG. 2, the controlling TSM 108 retains a mediating role in the provisioning actions. The message sequence begins with the issuer TSM 120 sending a service request message 150 to the controlling TSM 108. The controlling TSM 108 validates the service request message 150, for example by confirming the message originates from the issuer TSM 120 and that the issuer TSM 120 and/or the issuer is authorized to conduct provisioning actions with respect to the mobile device 102. The validation may be performed by any of a variety of methods known in the art including exchange of shared secrets or security tokens. The controlling TSM 108 also logs the service request message 150, for example by storing a log entry in the database 114. The controlling TSM 108 sends an acknowledge message 152 to the issuer TSM 120.

The controlling TSM 108 sends a wake up message 154 to the over-the-air client 110. The over-the-air client 110 responds by establishing an https connection 156 with the controlling TSM 108 and by establishing a connection 158 with the secure element 112. This results in establishing a secure connection 160 between the secure element 112 and the controlling TSM 108.

The over-the-air client 110 sends a get command message 162 to the controlling TSM 108, and a command associated with the service request message 150 is returned by the controlling TSM 108 to the over-the-air client 110. The over-the-air client 110 passes the command 164 to the secure element 112, and the secure element 112 executes the command. Alternatively, the secure element 112 may pass the command to the supplementary secure domain 113, the supplementary secure domain 113 may execute the command, and the supplementary secure domain 113 may return a command result to the secure element 112. The secure element 112 returns the command result 166 to the over-the-air client 110, and the over-the-air client 110 returns the command result 168 to the controlling TSM 108. The controlling TSM 108 logs the command result 168, for example by storing a log entry in the database 114. The service request message 150 may be mapped by the controlling TSM 108 into a sequence of commands, and the messages 162, 164, 166, and 168 may be repeated multiple times to complete this series of commands. When the command sequence is completed, the controlling TSM 108 logs the status of the service request message 150, for example by storing a log entry in the database 114, and sends a request status message 170 to the issuer TSM 120. The issuer TSM 120 returns an acknowledge message 172 to the controlling TSM 120.

Figure 3:
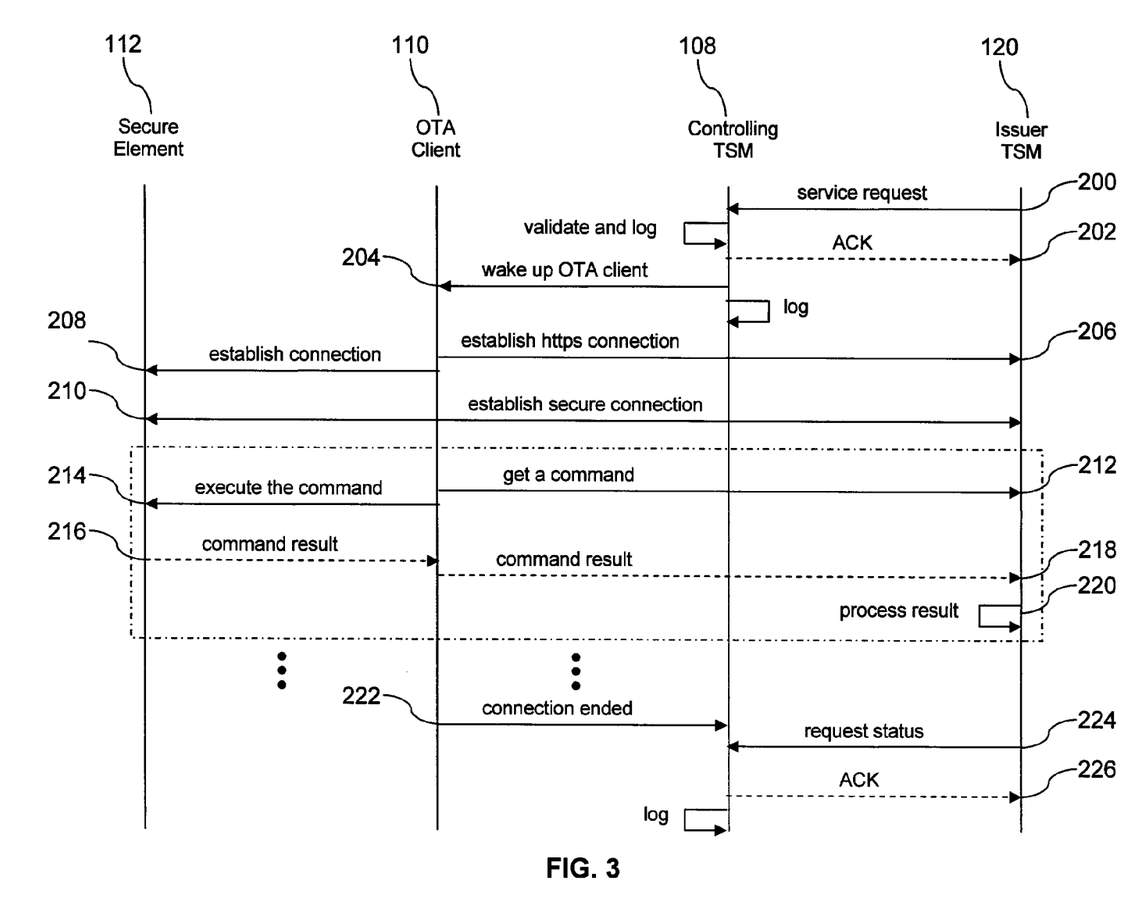
FIG. 3 is a message sequence diagram illustrating a messaging sequence according to an embodiment of the disclosure.

Turning now to FIG. 3, a message sequence for performing provisioning actions, for example a personalization provisioning action, is described. In the message sequence illustrated in FIG. 3, the controlling TSM 108 validates the issuer TSM 120 and then hands-off to the over-the-air client 110 to directly communicate with the issuer TSM 120. The controlling TSM 108 then substantially drops out of the communication between the over-the-air client 110 and the issuer TSM 120 for most of the remainder of the provisioning action, entering in at the end to receive a status message from the issuer TSM 120.

The message sequence begins with the issuer TSM 120 sending a service request message 200 to the controlling TSM 108. The controlling TSM 108 validates and logs the service request message 150, for example by entering a log entry in the database 114. The controlling TSM 108 sends an acknowledge message 202 to the issuer TSM 120.

The controlling TSM 108 sends a wake up message 204 to the over-the-air client 110 and logs the wake up message 204, for example by entering a log entry in the database 114. The over-the-air client 110 responds by establishing an https connection 206 with the issuer TSM 120 and by establishing a connection 208 with the secure element 112. This results in establishing a secure connection 210 between the secure element 112 and the issuer TSM 120.

The over-the-air client 110 sends a get command message 212 to the issuer TSM 120, and a command associated with the service request message 150 is returned by the issuer TSM 120 to the over-the-air client 110. The over-the-air client 110 passes the command 214 to the secure element 112, and the secure element 112 executes the command. Alternatively, the secure element 112 may pass the command to the supplementary secure domain 113, the supplementary secure domain 113 may execute the command, and the supplementary secure domain 113 may return a command result to the secure element 112. The secure element 112 returns the command result 216 to the over-the-air client 110, and the over-the-air client 110 returns the command result 218 to the issuer TSM 120. The issuer TSM 120 processes 220 the command result 218. The service request message 150 may be mapped by the issuer TSM 120 into a sequence of commands, and the messages 212, 214, 216, and 218 and the processing 220 may be repeated multiple times to complete this series of commands. When the command sequence is completed, the over-the-air client 110 closes the secure connection 222, and the issuer TSM 120 sends a request status message 224 to the controlling TSM 108. The controlling TSM 108 returns an acknowledge message 226 to the issuer TSM 120 and logs the status of the mobile device 102, for example by entering a log entry in the database 114.

Figure 4:
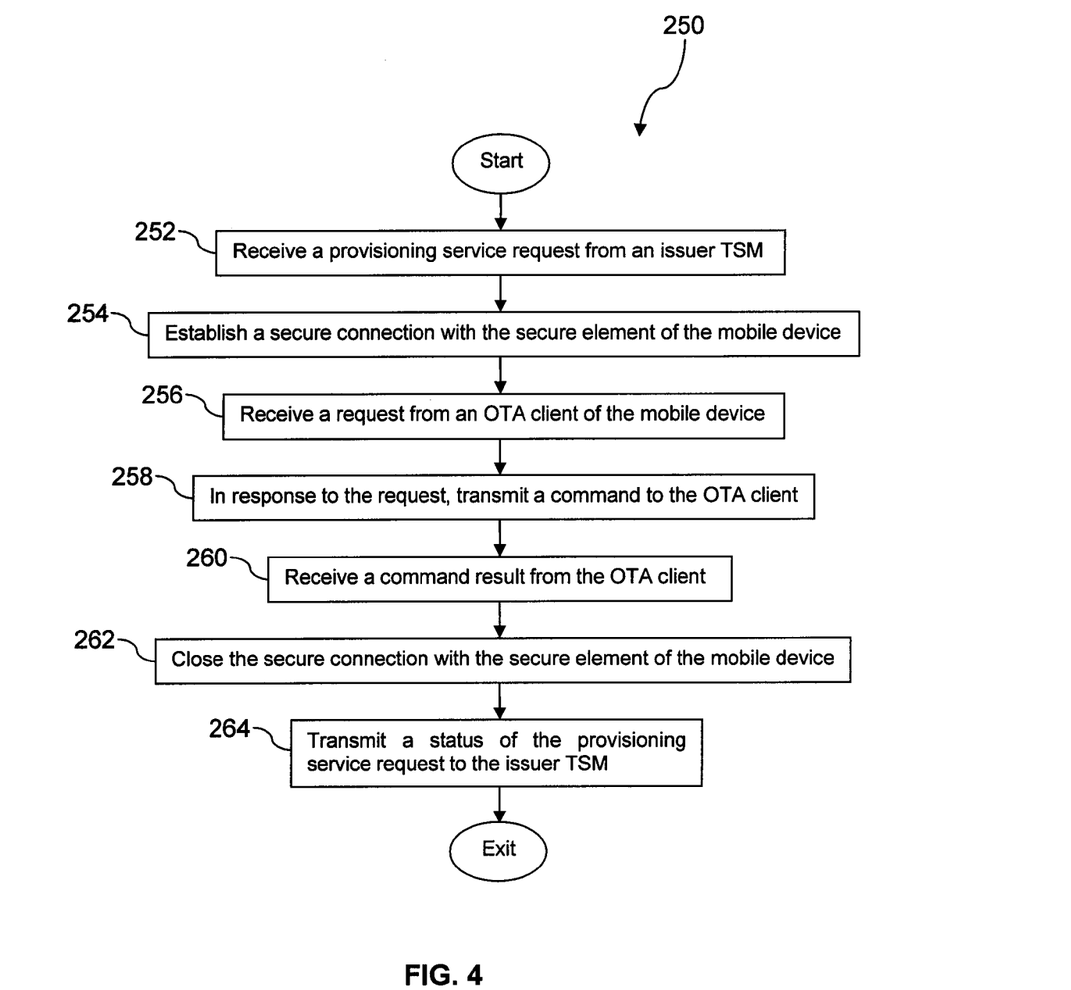
FIG. 4 is a flow chart of a method according to an embodiment of the disclosure.

Turning now to FIG. 4, a method 250 is described. At block 252, the controlling TSM 108 receives a provisioning service request from the issuer TSM 120. The provisioning service request may request any of a number of different provisioning actions be performed. The provisioning actions may comprise loading an electronic credit card application, a transit card application, an electronic coupon, an electronic loyalty card, or other financially related information. The provisioning actions may also comprise installing, personalizing, modifying, suspending, locking, and deleting the electronic credit card application on the mobile device 102. At block 254, the controlling TSM 108 establishes a secure connection with the secure element 112 of the mobile device 102, where the secure connection is provided at least partially by the over-the-air client 110.

At block 256, the controlling TSM 108 receives a command request from the over-the-air client 110. At block 258, the controlling TSM 108 sends a command to the over-the-air client 110. The command is related to the provisioning service request received by the controlling TSM 108 in block 252, for example by being one of a series of commands that collectively compose the action of the provisioning service request. The secure element 112 and/or the supplementary secure domain 113 processes the command. At block 260, the controlling TSM 108 receives a message from the over-the-air client 110 indicating the result of the secure element 112 and/or the supplementary secure domain 113 processing the command. The blocks 256, 258, and 260 may repeat a plurality of times until the series of commands composing the provisioning service request are each completed.

At block 262, the secure connection is closed by one of the controlling TSM 108 and the over-the-air client 110. At block 264, the controlling TSM 108 transmits to the issuer TSM 120 the status of the provisioning service request received in block 252 and the method ends or is repeated.

Figure 5:
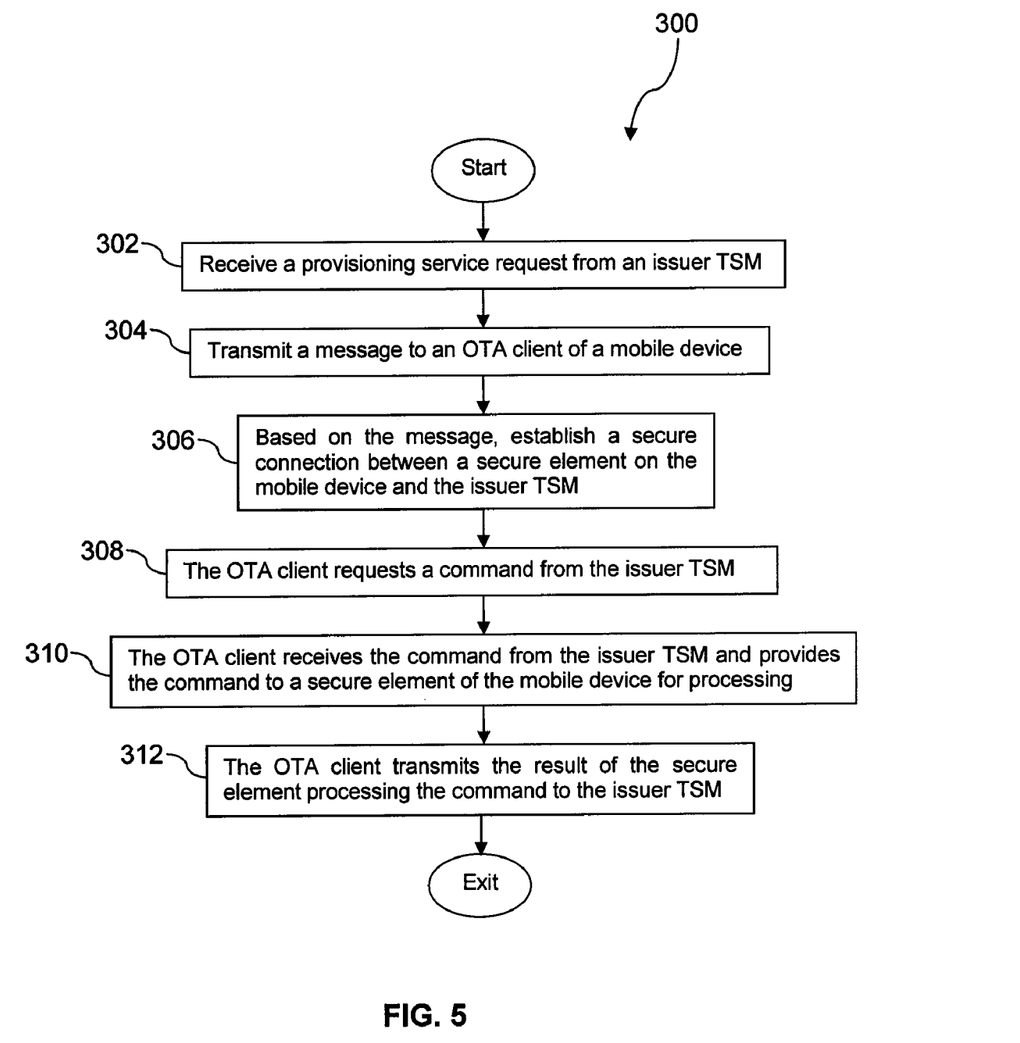
FIG. 5 is a flow chart of another method according to an embodiment of the disclosure.

Turning now to FIG. 5, a method 300 is described. At block 302 the controlling TSM 108 receives a provisioning service request from the issuer TSM 120. In an embodiment, the provisioning request may be any of a number of different provisioning actions. In another embodiment, however, the provisioning request is specifically a personalization provisioning request. A personalization provisioning action provides personalizing electronic credit card information such as an account number, an authorization code, and other confidential information associated with the electronic credit card.

At block 304, the controlling TSM 108 transmits a message to the over-the-air client 110 of the mobile device 102. The message requests the over-the-air client 110 to contact the issuer TSM 120 directly to complete a provisioning action. In block 306, based on the message from the controlling TSM 108, the over-the-air client 110 establishes a secure connection between the secure element 112 and the issuer TSM 120, where the secure connection is provided at least partially by the over-the-air client 110.

At block 308, the over-the-air client 110 requests a command from the issuer TSM 120. At block 310, the over-the-air client 110 receives the command from the issuer TSM 120 and provides the command to the secure element 112 and/or the supplementary secure domain 113 for processing. At block 312, the over-the-air client 110 transmits the result of processing the command to the issuer TSM 120. The blocks 308, 310, and 312 may be repeated a number of times, for example when the provisioning service request is partitioned into a series of commands by the issuer TSM 120.

Figure 6:
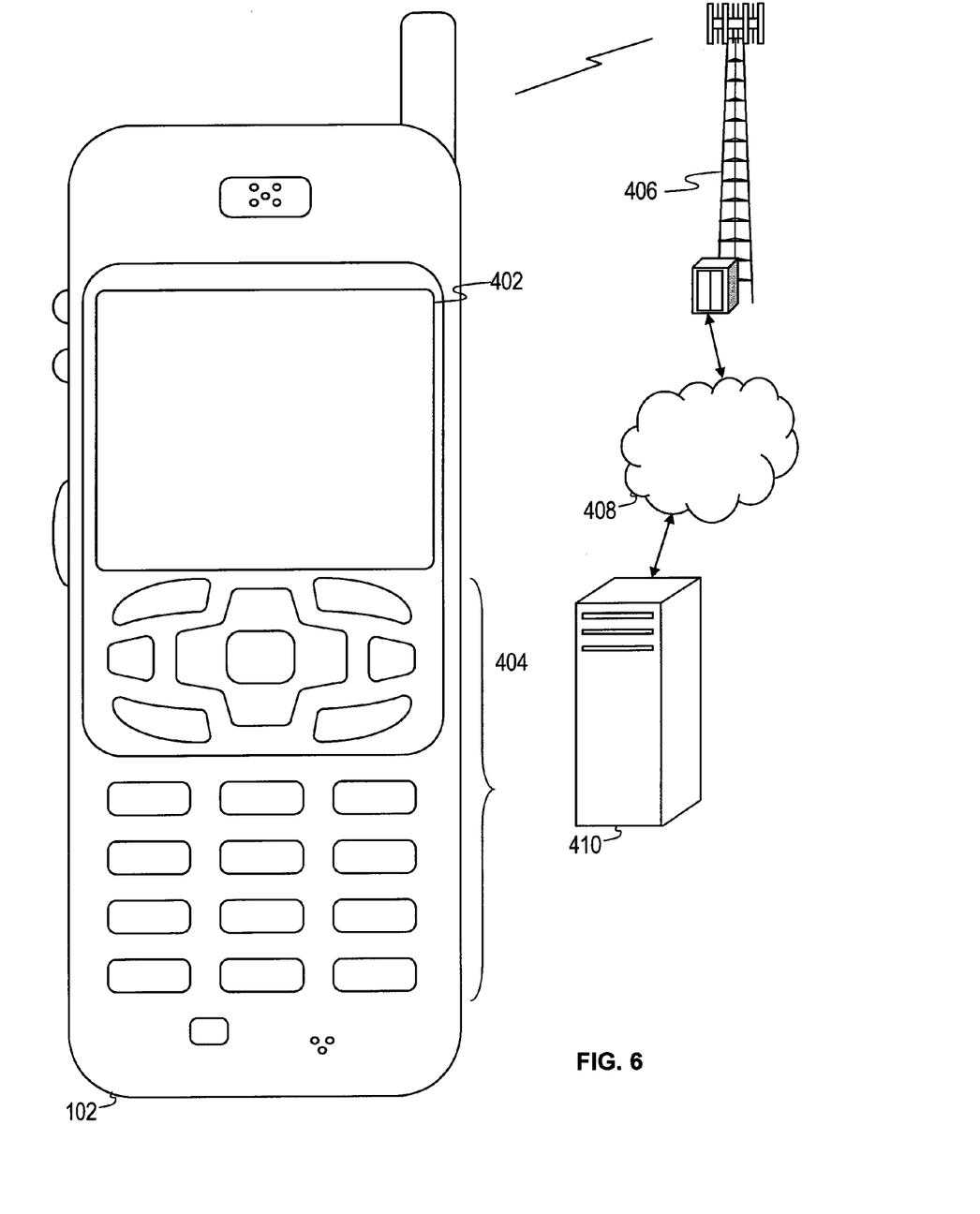
FIG. 6 is an illustration of a handset according to an embodiment of the disclosure.

FIG. 6 shows a wireless communications system including the mobile device 102. FIG. 6 depicts the mobile device 102, which is operable for implementing aspects of the present disclosure, but the present disclosure should not be limited to these implementations. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 402 to show a web page. The web page may be obtained via wireless communications with a base transceiver station (BTS) 406, a wireless network access node, a peer mobile device 102 or any other wireless communication network or system. While a single base transceiver station 406 is illustrated, it is understood that the wireless communication system may comprise additional base transceiver stations. In some instances, the mobile device 102 may be in communication with multiple base transceiver stations 406 at the same time. The base transceiver station 406 (or wireless network access node) is coupled to a wired network 408, such as the Internet. Via the wireless link and the wired network, the mobile device 102 has access to information on various servers, such as a server 410. The server 410 may provide content that may be shown on the display 402. Alternately, the mobile device 102 may access the base transceiver station 406 through a peer mobile device 102 acting as an intermediary, in a relay type or hop type of connection.

Figure 7:
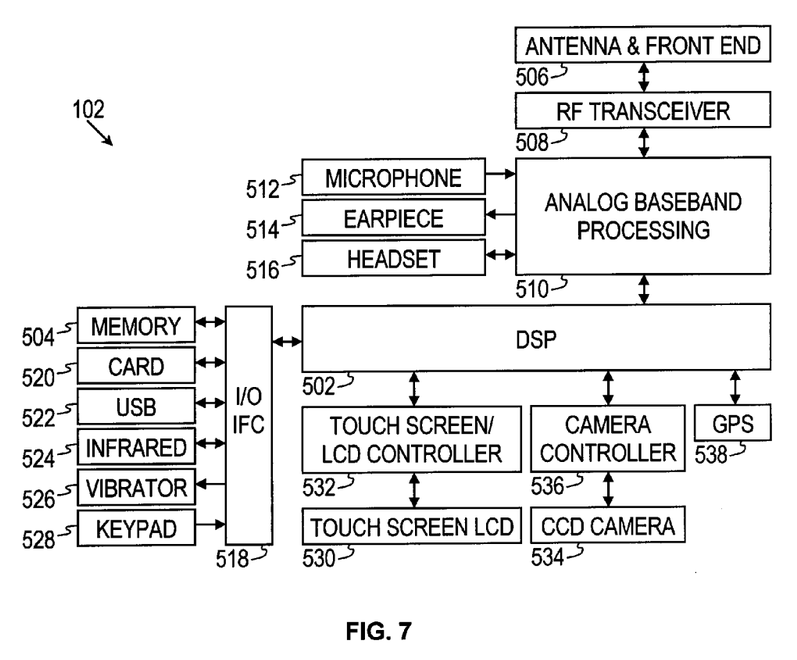
FIG. 7 is a block diagram of a handset according to an embodiment of the disclosure.

FIG. 7 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch-sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch-sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the input/output interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 8:
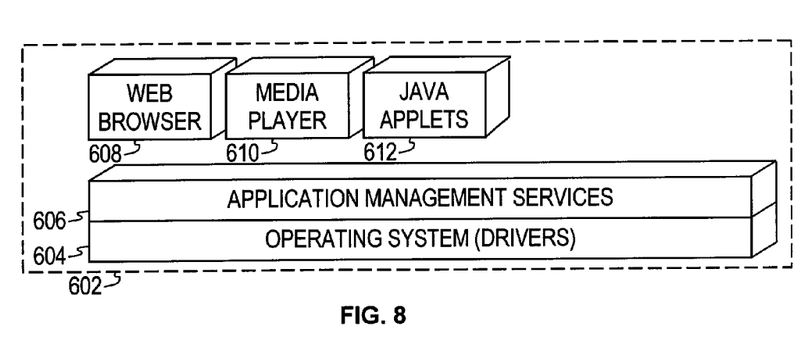
FIG. 8 is a block diagram of a software architecture of a handset according to an embodiment of the disclosure.

FIG. 8 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 102. Also shown in FIG. 8 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality.

Figure 9:
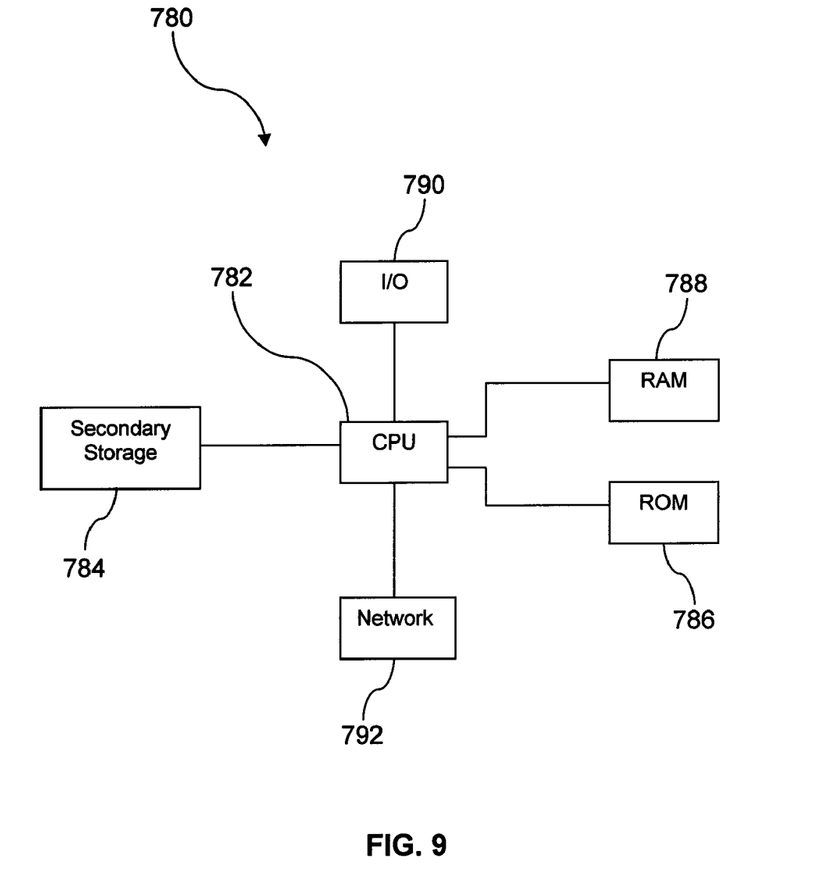
FIG. 9 illustrates an exemplary general purpose computer system suitable for implementing the several embodiments of the disclosure.

Some aspects of the system described above may be implemented on any general-purpose computer with sufficient processing power, memory resources, and network throughput capability to handle the necessary workload placed upon it. FIG. 9 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of provisioning a secure element on a mobile device, comprising:
   receiving a provisioning service request associated with a credit card from a first trusted service manager associated with the credit card;
   establishing a secure connection with the secure element of the mobile device, wherein at least a portion of the secure connection is provided by a wireless link;
   receiving a request over the secure connection from an over-the-air client of the mobile device;
   in response to the request, transmitting a command over the secure connection to the over-the-air client, the command relating to at least a portion of the services identified in the provisioning service request;
   receiving a command result over the secure connection from the over-the-air client;
   closing the secure connection with the secure element of the mobile device;
   transmitting a status of the provisioning service request, wherein the receiving the request, the transmitting the command, the receiving the command result, and the transmitting the status are performed by a second trusted service manager associated with a wireless service provider, and wherein the secure connection is between the secure element of the mobile device and the second trusted service manager;
   receiving, by the second trusted service manager, a new provisioning service request from the first trusted service manager, wherein the new provisioning service request is a request to provision personalization information of the credit card to the secure element;
   transmitting, by the second trusted service manager, a message to the over-the-air client on the mobile device;

based on the message, establishing a new secure connection between the secure element on the mobile device and the first trusted service manager, wherein at least a portion of the new secure connection is provided by another wireless link;

requesting, by the over-the-air client, a new command from the first trusted service manager, the new command relating to at least a portion of the services identified in the new provisioning service request;

receiving, by the over-the-air client, the new command from the first trusted service manager;

providing, by the over-the-air client, the new command to the secure element for processing; and transmitting, by the over-the-air client, the result of the secure element processing the new command to the first trusted service manager.

2. The method of claim 1, wherein the mobile device is one of a mobile phone, a personal digital assistant, and a media player.

3. The method of claim 1, further including validating, by the second trusted service manager, the provisioning service request.

4. The method of claim 3 further including:
logging, by the second trusted service manager, the provisioning service request; and
transmitting, by the second trusted service manager, an acknowledgment of the provisioning service request to the first trusted service manager.

5. The method of claim 4 further comprising transmitting, by the second trusted service manager, a wake up message to the over-the-air client of the mobile device.

6. The method of claim 5, wherein the validating the provisioning request, the logging the provisioning request, and the transmitting the acknowledgment occur before the transmitting the wake up message.

7. The method of claim 1, wherein the provisioning service request comprises one of downloading the credit card, personalizing the credit card, locking the credit card, suspending the credit card, modifying the credit card, and deleting the credit card.

8. The method of claim 1, wherein the communication with the first trusted service manager associated with the credit card is a wireless communication session.

9. The method of claim 1, wherein the wireless link is one of a code division multiple access (CDMA), global system for mobile communication (GSM), and a worldwide interoperability for microwave access (WiMAX) wireless link.

10. The method of claim 1, wherein the first trusted service manager is operated by a third party.

11. The method of claim 1, wherein the receiving the provisioning service request is performed by the second trusted service manager.

12. The method of claim 1, further comprising receiving, by the second trusted service manager, an acknowledgment of the status of the provisioning service requested from the first trusted service manager.

13. The method of claim 1, further comprising:
receiving, by the second trusted service manager, another new provisioning service request from the first trusted service manager;
transmitting, by the second trusted service manager, a new message to the over-the-air client on the mobile device; and
based on the new message, establishing another new secure connection between the secure element on the mobile device and the first trusted service manager to enable the over-the-air client to request another new command from the first trusted service manager, receive the other new command from the first trusted service manager, provide the other new command to the secure element for processing, and transmit the result of the secure element processing the other new command to the first trusted service manager, wherein at least a portion of the other new secure connection is provided by a wireless link.

14. The method of claim 13, wherein the other new provisioning service request is a request to provision personalization information of the credit card to the secure element.

15. A method of, provisioning a secure element on a mobile device, comprising:
receiving a provisioning service request associated with a credit card from a first trusted service manager associated with the credit card;
establishing a secure connection with the secure element of the mobile device, wherein at least a portion of the secure connection is provided by a wireless link;
receiving a request over the secure connection from an over-the-air client of the mobile device;
in response to the request, transmitting a command over the secure connection to the over-the-air client, the command relating to at least a portion of the services identified in the provisioning service request;
receiving a command result over the secure connection from the over-the-air client;
closing the secure connection with the secure element of the mobile device;
transmitting a status of the provisioning service request, wherein the receiving the request, the transmitting the command, the receiving the command result, and the transmitting the status are performed by a second trusted service manager associated with a wireless service provider, and wherein the secure connection is between the secure element of the mobile device and the second trusted service manager;
receiving, by the second trusted service manager, a new provisioning service request from the first trusted service manager, wherein the new provisioning service request is a request to provision personalization information of the credit card to the secure element;
transmitting, by the second trusted service manager, a message to the over-the-air client on the mobile device;
based on the message, establishing a new secure connection between the secure element on the mobile device and the first trusted service manager, wherein at least a portion of the new secure connection is provided by another wireless link;
requesting, by the over-the-air client, a new command from the first trusted service manager, the new command relating to at least a portion of the services identified in the new provisioning service request;
receiving, by the over-the-air client, the new command from the first trusted service manager;
providing, by the over-the-air client, the new command to the secure element for processing; and
transmitting, by the over-the-air client, the result of the secure element processing the new command to the first trusted service manager, wherein the personalization information comprises personal credit card information.

16. A method of provisioning a secure element on a mobile device, comprising:
receiving a provisioning service request associated with a credit card from a first trusted service manager associated with the credit card;

establishing a secure connection with the secure element of the mobile device, wherein at least a portion of the secure connection is provided by a wireless link;

receiving a request over the secure connection from an over-the-air client of the mobile device;

in response to the request, transmitting a command over the secure connection to the over-the-air client, the command relating to at least a portion of the services identified in the provisioning service request;

receiving a command result over the secure connection from the over-the-air client;

closing the secure connection with the secure element of the mobile device;

transmitting a status of the provisioning service request, wherein the receiving the provisioning service request is performed by a second trusted service manager associated with a wireless service provider, wherein the receiving the request, the transmitting the command, the receiving the command result, and the transmitting the status are performed by the first trusted service manager, wherein the secure connection is between the secure element of the mobile device and the first trusted service manager, and wherein the provisioning service request is a request to provision personalization information of the credit card to the secure element;

receiving, by the second trusted service manager, a new provisioning service request from the first trusted service manager, wherein the new provisioning service request comprises one of downloading the credit card, locking the credit card, suspending the credit card, modifying the credit card, and deleting the credit card;

establishing a new secure connection between the secure element of the mobile device and the second trusted service manager, wherein at least a portion of the new secure connection is provided by a wireless link;

receiving, by the second trusted service manager, a new request over the secure connection from an over-the-air client of the mobile device;

in response to the new request, transmitting, by the second trusted service manager, a new command over the new secure connection to the over-the-air client, the new command relating to at least a portion of the services identified in the new provisioning service request;

receiving, by the second trusted service manager, a new command result over the new secure connection from the over-the-air client;

closing the new secure connection with the secure element of the mobile device; and transmitting, by the second trusted service manager, a status of the new provisioning service request to the first trusted service manager.

17. The method of claim 16, further comprising transmitting, by the second trusted service manager, an acknowledgment of the status of the provisioning service request to the first trusted service manager.

* * * * *